United States Patent [19]
Caldwell et al.

[11] 3,754,341
[45] Aug. 28, 1973

[54] CHAIN TRENCHER WITH SHOCK-RESISTANT SILENT DRIVE

[75] Inventors: Robert H. Caldwell, Jacksonville; Larry I. Pauline, Alexander, both of Ill.

[73] Assignee: Grizzly Corporation, Jacksonville, Ill.

[22] Filed: Apr. 13, 1972

[21] Appl. No.: 243,766

[52] U.S. Cl. .................. 37/86, 30/383, 37/191 A, 83/820
[51] Int. Cl. .............................................. E02f 5/06
[58] Field of Search .................. 37/86, 69, DIG. 6, 37/DIG. 7, 191 A, 192 A; 30/383, 386, 387; 83/820, 821; 198/20 A

[56] References Cited
UNITED STATES PATENTS

| | | | |
|---|---|---|---|
| 3,398,471 | 8/1968 | Brown | 37/86 |
| 2,714,262 | 8/1955 | Malzahn | 37/86 |
| 3,659,364 | 5/1972 | Wilson | 37/191 A X |
| 2,708,800 | 5/1955 | Logus | 37/DIG. 7 |
| 2,888,757 | 6/1959 | Sheen | 37/86 |
| 3,593,804 | 7/1971 | Snider | 37/191 A X |
| 3,315,384 | 4/1967 | Weyers | 37/191 A |

FOREIGN PATENTS OR APPLICATIONS 1,035,141   7/1966   Great Britain .................. 37/DIG. 7

Primary Examiner—Robert E. Pulfrey
Assistant Examiner—Clifford D. Crowder
Attorney—Charles W. Rummler et al.

[57] ABSTRACT

An attachment to the frame of a tractor including auxiliary hydraulic power and having an endless digging chain with a reversible oil-hydraulic drive for light and medium trenching, said chain and sprocket drive having oaken chain guide rails combined with a resilient sprocket mounting structure for silent shock-resistant chain and cutter operation and longer chain and cutter life.

3 Claims, 6 Drawing Figures

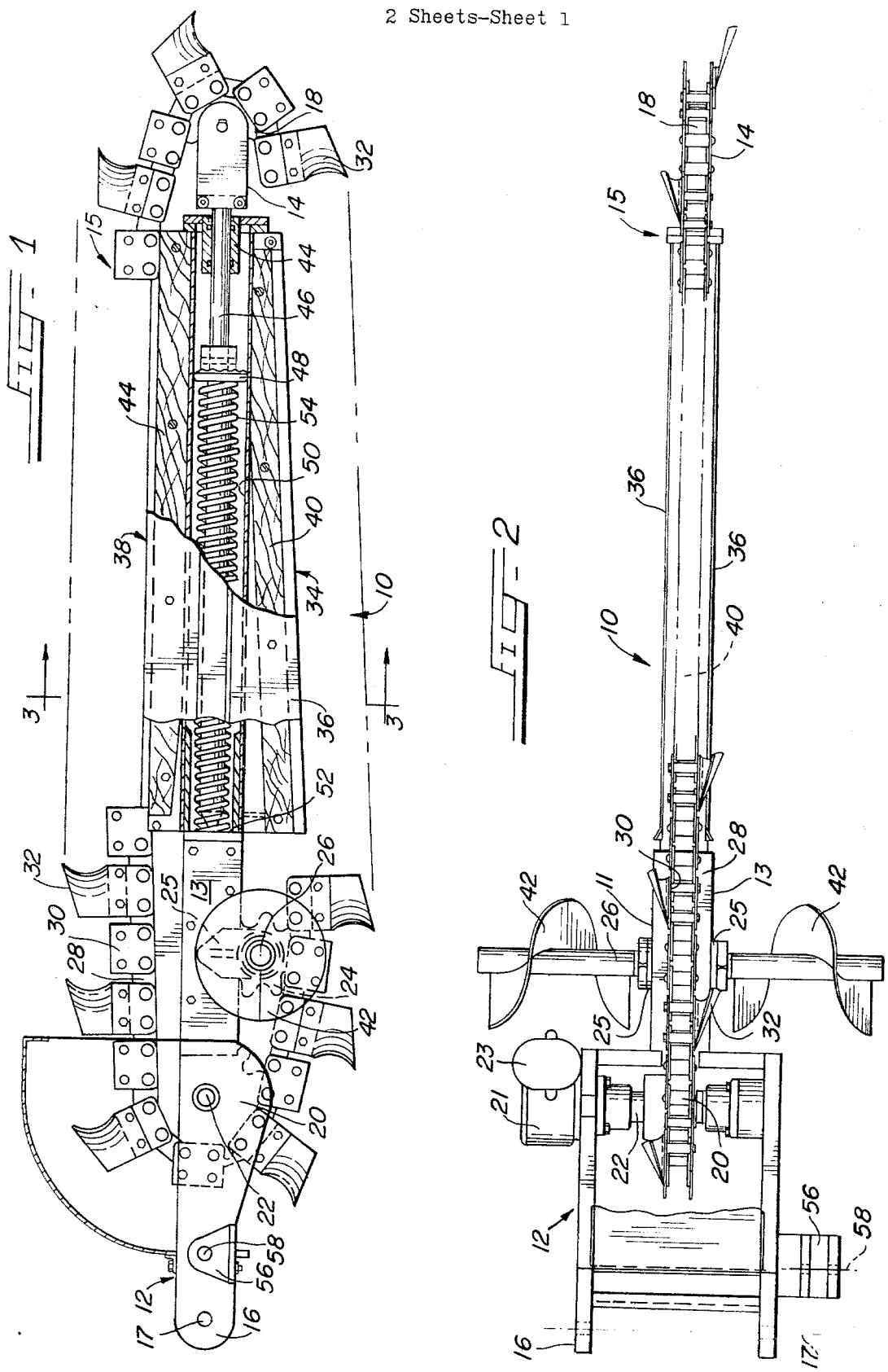

Patented Aug. 28, 1973
3,754,341
2 Sheets-Sheet 2
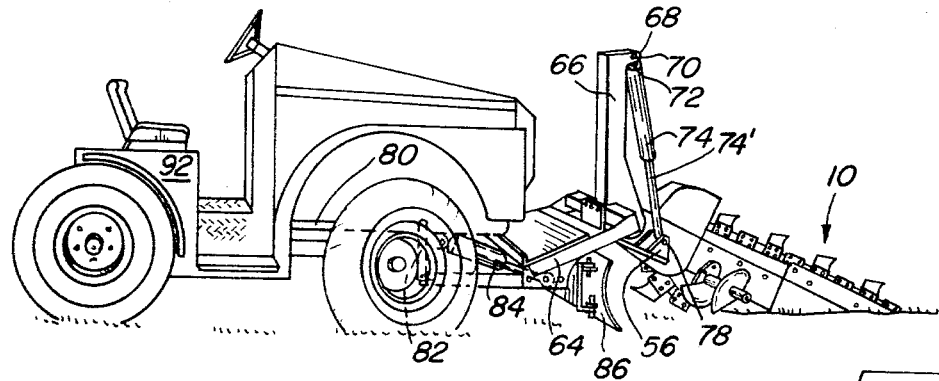
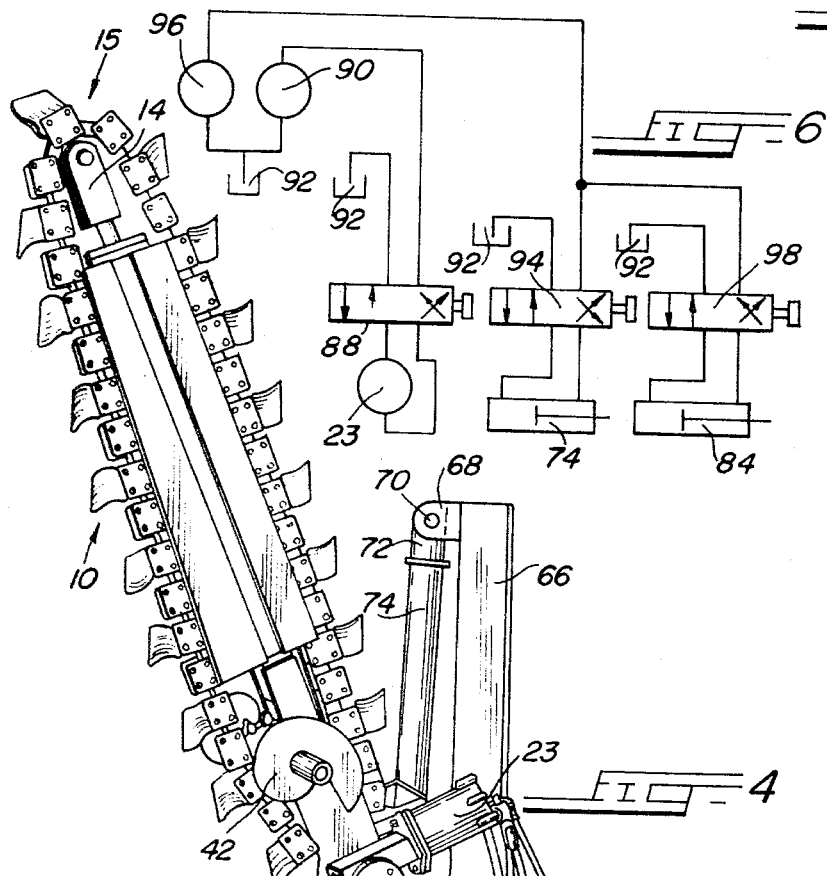
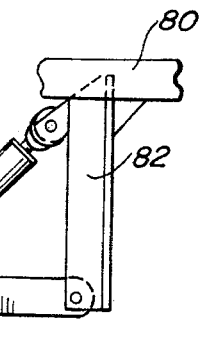
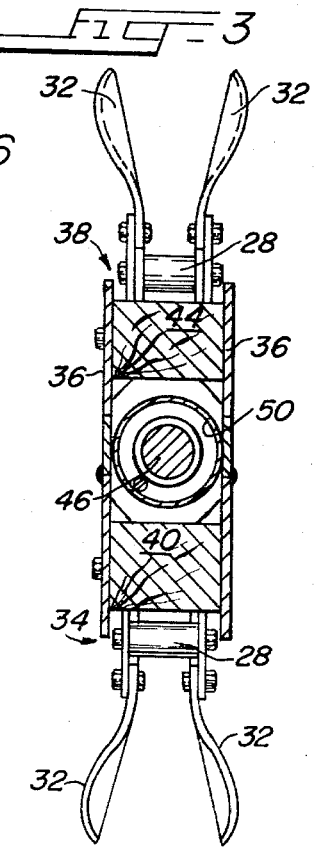

CHAIN TRENCHER WITH SHOCK-RESISTANT SILENT DRIVE

BACKGROUND OF THE INVENTION

In the excavation of trenches as used for the laying of small pipe or cable at moderate depth, it has been customary to remove the earth by a series of spaced buckets or scraper teeth commonly called cutters which are mounted on an endless chain and project from a trencher head on a horizontally extending boom which is pivotally mounted to the tractor frame. The tail end of the boom suspends the cutters which are lowered to and into the ground and are filled by being pulled out from the ground toward the trencher head by the endless chain. The chain has extended side bars attached thereon onto which the buckets are bolted and from whence the removed earth contained therein is discharged preferably to an auger flight to be distributed to the right and left side of the trench.

In general, the soil conditions in which the chain trencher operates lacks uniformity. Invariably there are hard spots and soft spots with rocks and roots therein. As the cutters are pulled through this ground, the load on each can vary widely, sometimes assuming overloading impact proportions and producing considerable noise. The duty cycle of earth moving equipment in general permits a certain amount of overloading impact and slapping of the chain against the guide rails without inducing structural failure and a certain level of noise without objection, but from practical economic and environmental standpoints, the conventional machinery is built to withstand and produce only so much. Such considerations pose a challenge to the trencher designer to come up with a design which will operate quieter and which will withstand such overloadings without detriment to operating life for the user, at no increase in cost to the buyer.

It is well known that the slap of the endless chain on a conventional steel chain rail is one of the principal sources of operating noise for present trenchers and that rigidity of sprocket mounting structure in the drive train of chain trenchers is responsible for many early chain and cutter failures especially in those field applications that subject the equipment to widely varying overloads will reduce the peak overloads induced in the moving parts of the trencher and prolong its operating life. There is thus an established need for a chin trencher drive train which reduces the noise generated by the slap of the endless chain on the rail and which provides a resilient drive train mounting structure that will yield under the impact of an overload on the chain cutters and prevent early chain and cutter failure in the field.

SUMMARY OF THE INVENTION

The gist of this invention lies in an improved digging drive train for a trencher, which is comparatively silent in operation and which is resiliently shock resistant, having a chain drive with at least two sprockets whose center distance acts to extend under the urging of a compression spring. Spring loaded Extension of the sprocket center distance takes up the slack in the chain against opposed guide rails which at a location adjacent to the sprocket are spaced apart a distance slightly greater than the base diameter of the sprocket and yields under overloading, and causes the chain to rub silently on oaken guide rails. In this trencher an oil-hydraulic motor mounts to the pivoted head of the boom. A drive sprocket mounts on the shaft of the motor and a tail sprocket mounts on the tail end of the boom. The tail of the boom is slidably mounted relative to the head of the boom resulting in a variable center distance between the drive and tail sprockets. A compression spring is mounted therebetween which urges the drive sprocket from the tail sprocket in the taking up of the slack in the chain. An idler sprocket mounts on the lower side of the boom intermediate the head and tail ends of the boom and engaging the endless chain thereon. Optional right and left hand auger flights mount on the shaft of the idler sprocket for discharging the earth to the right and left sides of the boom. A plurality of spaced right and left cutters mounts to the opposite sides of the chain. The endless chain engages the drive sprocket, the tail sprocket and the idler sprocket, encompassing the centers of each resulting in rotation of all sprockets in the same direction. Oaken chain rails mounted on both the lower and upper sides of the boom which at a location adjacent to the sprocket are spaced apart a distance slightly greater than the base diameter of the sprocket support the chain. Side plates on each side of the chain rail guide the chain therealong and prevent rocks, stones, etc. from lodging between the sprocket and the chain.

DESCRIPTION OF THE DRAWINGS

FIG. 1 is a fragmentary side view of the trencher with parts broken away;

FIG. 2 is a fragmentary top view of the trencher;

FIG. 3 is a cross-sec'ional view taken along the lines 3—3 of FIG. 1;

FIG. 4 is a fragmentary side view of the trencher in transport position;

FIG. 5 is a perspective side view of the trencher in excavating position as installed on a typical mobile vehicle; and FIG. 6 is a diagram of the oil-hydraulic circuit for the operation of the trencher.

DESCRIPTION OF THE PREFERRED EMBODIMENT

Referring to the drawings, particularly FIGS. 1 and 2, the trencher attachment comprises a boom 10 having a left side 11 and a right side 13, a head end 12 and a tail end 15 extending outwardly from said head end 12 with a tailpiece 14 slidably mounted in said boom 10 adjacent said tail end 15 and provided with a tail sprocket 18 journaled in said tailpiece 14. A bored pivot axis 17 centers pivot end 16. A drive sprocket 20 has a drive shaft 22 journaled in the head 12 adjacent to the pivot end 16. An auger sprocket 24 has a shaft 26 journaled in brackets 25 depending from and secured to the boom 10 intermediate the tail sprocket 18 and the drive sprocket 20 and offset from the lower side of the boom 10. All sprockets 18, 20 and 24 have a common plane of rotation. An endless chain 28 engages tail sprocket 18, drive sprocket 20 and auger drive sprocket 24 so as to rotate all sprockets in the same direction. Spacers 30 are secured to the sides of the links of chain 28 one between each of the cutters 32 which are bolted to the chains for the excavation and removal of earth as the chain 28 is pulled from the ground on the lower side of the boom 10. The cutters 30 are mounted alternately one on each side of the chain 28, as shown in FIGS. 2 and 4. Drive sprocket 20 rotates in a clockwise direction, as viewed in FIG. 1, to pull chain 28 from the ground. A gear drive 21 which is mounted to the head 12 on the left connects with an extension of shaft 22, as shown in FIGS. 2 and 4. A hydraulic motor 23 is mounted on and engages the gera drive 21 for the primary drive of the trencher.

Guide rails 34 mounted to the excavation or lower side of the boom 10, as shown in FIGS. 1 and 3, comprise laterally spaced steel side plates 36, as shown in FIGS. 2 and 3, which are welded to the sides of the boom 10 and straddle the common plane of rotation of sprockets 18, 20 and 24. The guide rail 34 runs longitudinally between the tail sprocket 18 and the idler sprocket 24 and provides guiding clearance for the moving of the chain 28 therealong. An oak bearing plate 40 which is mounted to and between the spaced side plates 36 on the excavation or lower side of the boom 10 extends longitudinally between the tail sprocket 18 and the auger drive sprocket 24 having a running surface spaced at a distance from the sprocket axes slightly greater than half the base diameters of the respective sprockets thereof and provides a sound-deadening bearing surface for supporting the chain 28 sliding thereover.

The upper end of the guide rails 38 are mounted on the upper side of the boom 10, as shown in FIGS. 1 and 3. A second oak bearing plate 44 is mounted to and between the side plates 36 on the upper side of the boom 10 and extends longitudinally between the tail sprocket 18 and the drive sprocket 20 having a running surface spaced at a distance from the sprocket axes slightly greater than half the base diameters of the respective sprockets thereof and provides a sound-deadening bearing surface for supporting the chain 28 sliding thereover.

Right and left hand auger flights 42 may be mounted to extensions of shaft 26 on opposed sides of the boom 10, as shown in FIG. 2, for the distribution of excavated earth in piles to the right and the left side of the trench.

A slide bushing 44 having its bore axis on a line joining the centers of and in the common plane of roation with the drive sprocket 20 and the rail sprocket 18 is mounted to the tail end 15 of the boom 10, as shown in FIG. 1. A tail shaft 46 mounts to and supports the tailpiece 14 and the upper end thereof is slidable in the bushing 44. A pilot 48 is concentrically mounted and pinned on the shaft 46 a short distance from said bushing 44. A guide 50 having its bore axis also on a line joining the centers of and in the common plane of rotation with the drive sprocket 22 and the tail sprocket 18 is mounted in the boom 10, as shown in FIGS. 1 and 3, and extends from the tail end 15 to adjacent to the idler sprocket 24 thereof for slidably guiding the pilot 48 in the extension or contraction of the center distance between the tail sprocket 18 and the drive sprocket 20. A guide cylinder base end 52 adjacent to the idler sprocket 24 terminates the length of the guide 50, as shown in FIG. 1. A compression spring 54 which is concentrically mounted within the guide 50 and on the shaft 46 between the pilot 48 and the base end 52 urges the tail sprocket 18 from the drive sprocket 20 and takes the slack out of chain 28 and provides resilience to the drive train in the event one of the cutters 32 hits an obstruction during trenching.

A trunion mount 56 mounts to the head end 12 of the boom 10, as shown in FIGS. 1 and 2, and has its bored axis 58 in parallel relation with and displaced outwardly from the bored axis 58 of pivot 16. A trunion pin 78 is mounted in the bored axis 58. The trunion 56 is mounted on the right side 13 of the head end 12 on the side opposite the gear drive 21 and offset relative to the plane of action of the raising and lowering of boom 10 about pivot end 16.

In the attachment of the trencher to the tractor, as shown in FIGS. 4 and 5, trencher support trunion members 60 are mounted to a primary extension member 64 in spaced relation. A trunion pin 62 which is mounted in a bushed bore in trunion members 60 pivotally engages the pivot end 16 in the trencher head 12, as shown in FIG. 4.

Vertical bracket members 82 solidly mount at the upper end to a tractor frame element 80 in a location which is forward of the front axle suspension of the truck, as shown in FIG. 5. A longitudinally disposed arm 82' is pivotally mounted at one end to the lower end of member 82. The primary extension member 64 pivotally mounts at its rear end to the lower end of vertical bracket member 82. A backfill blade 86 may be mounted to the front end of arm 82'. A first double-acting hydraulic jack 84 has its head end pivotally mounted to the upper end of the bracket member 82 adjacent to the frame element 80, as shown in FIG. 4, and has its rod end 84' pivotally mounted to the arm 82' intermediate between the trencher support trunion members 60 and the rear end of the primary extension member 64 for the raising and lowering of the backfill blade 86 under controlled hydraulic power.

In the raising or lowering of the trencher boom 10 on the truck for the purpose of either transport or trenching, a generally upward secondary extension member 66 mounts at its base end to the forward end of the primary extension member 64, as shown in FIGS. 4 and 5. A hydraulic jack support trunion member 68 is mounted to the top end of the extension member 66. A first trunion pin 70 is mounted in the bore of trunion 68. A hydraulic jack head-end support pivot 72 is pivotally mounted to the pin 70. A second double-acting hydraulic jack 74 having its head-end swivelly connected to the first trunion pin 70 has its rod end 74' extending generally in a downwardly direction. A second trunion pin 78 which is mounted in the bore axis 58 of trunion mount 56 on the head end 12 of the boom 10 is pivotally on the lower end of rod end 74' of hydraulic jack 74 for the raising and lowering of said trencher boom 10 in the application of hydraulic power thereto.

The system for supplying oil-hydraulic power to the hydraulic motor 23 which is the primary drive of the trencher digging chain 28 comprises a first four-way spool valve 88 which is in fluid communication with the motor 23 which is the prime drive of the digging chain 28 for the reversible drive thereof, as shown in FIG. 6. A first engine driven pump 90 having a hydraulic fluid reservoir 92 is in fluid communication with the valve 88 and supplies hydraulic power to the motor 23.

The system for supplying hydraulic power to the double-acting hydraulic jack 74 for the raising and lowering of the trencher boom 10 comprises a second four-way spool valve 94 which is in fluid communication with the double-acting hydraulic jack 74 for the raising and lowering of boom 10, as shown in FIG. 6. A second engine-driven pump 96 having in common with pump 90 the hydraulic fluid reservoir 92 is in fluid communication with the valve 94 and supplies hydraulic power to the jack 74.

The system for supplying hydraulic power to the double-acting jack 84 for the raising and lowering of the backfill blade 86 and the trencher boom 10 comprises a third four-way spool valve 98 which is in fluid communication with the double-acting hydraulic jack 84 for the raising and lowering of boom 10 and blade 86. The second pump 96 is also in fluid communication with the valve 98 for the hydraulic supply thereto.

Although but one specific embodiment of this invention has been herein shown and described, it will be understood that the details of construction shown may be altered or omitted without departing from the spirit of the invention as defined by the appended claims.

We claim:

1. A trencher for attachment to an extension of the frame of a light truck having a plurality of cutters mounted on an endless chain for a continuous excavation of earth comprising:
   a. an extendable boom having a head end and a tail end slidable on the head end, and a lower side and an upper side, said boom pivotally mounted at said head end to the extension of the frame of the truck,
   b. a main drive sprocket having an axis rotatably mounted to the head end of the boom and engaging the endless chain,
   c. a tail sprocket rotating in the same plane as the main drive sprocket and having an axis rotatably mounted to the tail end of the boom and engaging the endless chain,
   d. an auger drive sprocket rotating in the same plane as the main drive sprocket and having an axis rotatably mounted to the lower side of the boom means intermediate of the main drive sprocket and the tail sprocket and engaging the endless chain, said sprocket rotating in the same direction as the main and tail sprockets,
   e. chain guide rails mounted on the head end of the boom between the tail and the main and auger drive sprockets having upper and lower chain running surfaces lying in the plane of and between the sprockets and spaced slightly greater than half the base diameters of the sprockets from the centers thereof,
   f. a spring means mounted between the head end and the tail end of the slidably extendable boom urging the tail end from the head end along a line connecting the centers of the axes of the drive sprocket and the tail sprocket, and
   g. a hydraulic drive means for driving the main drive sprocket.

2. A trencher attachment as set forth in claim 1 wherein the chain guide rail running surface comprises wooden bearing plates mounted along each of said upper and lower sides of the boom.

3. A trencher for attachment to a frame of an engine driven tractor having auxiliary oil-hydraulic power comprising a boom having a lower and upper side and a head end and a tail end slidably mounted thereto, a tail sprocket journaled in said tail end, a pivot having a bored axis incorporated in the head end, a main drive sprocket in a common plane of rotation with the tail sprocket having a drive shaft journaled in the head end adjacent to the pivot, an auger drive sprocket in the common plane of rotation of the head and tail sprockets having a shaft journaled in the boom intermediate between the tail sprocket and the main drive sprocket and offset to the lower side of the boom, an endless chain engaging the tail sprocket, the main drive sprocket and the auger drive sprocket for rotation all in the same direction, extended side bars secured to both sides of the chain, a plurality of cutters bolted to every other of the extended side bars and alternately spaced on each side of said chain, a worm gear drive mounted on the head end of the boom connecting with an extension of the main drive sprocket shaft, a hydraulic motor operationally connected to the worm gear drive, a guide rail mounted to the lower side of the head end of the boom including laterally spaced steel side plates bolted to the sides thereof, said side plates straddling the common plane of rotation of the sprockets and running longitudinally between the tail sprocket and the auger drive sprocket providing guiding clearance for the moving of the chain therethrough, a wooden bearing plate mounted to and between the spaced side plates of the lower side of the head end of the boom extending longitudinally between the tail sprocket and the auger drive sprocket having upper and lower chain running surfaces lying in the plane of and between the sprockets and spaced slightly greater than half the base diameters of the sprockets from the centers thereof, a guide rail mounted to the upper side of the head end of the boom including laterally spaced steel side plates bolted to the sides thereof, said side plates straddling the common plane of rotation of the sprockets and running longitudinally between the tail sprocket and the main drive sprocket providing guiding clearance for the moving of the chains therethrough, a wooden bearing plate mounted to and between the spaced sideplates on the upper side of the head end of the boom extending longitudinally between the tail sprocket and the main drive sprocket having upper and lower chain running surfaces lying in the plane of and between the sprockets and spaced slightly greater than half the base diameters of the sprockets from the centers thereof, a slide bushing having its bore axis on a line joining the centers and in the common plane of rotation of the tail and main drive sprockets mounted on the head end of the boom, a tail shaft mounted on the tail end of the boom slidably mounted in the slide bushing, a pilot ring concentrically mounted on and pinned to said tail shaft along the length thereof at some distance from said bushing, a pilot ring guide cylinder having its bore axis on a line joining the centers and lying in the common plane of rotation of the tail and drive sprockets mounted in the head end of the boom extending from adjacent to the tail end to adjacent to the auger drive sprocket, a base end of the guide cylinder terminating said guide cylinder adjacent to the auger drive sprocket, a compression spring concentrically mounted on the tail shaft between the pilot ring and the base end of the guide cylinder urging the tail sprocket from the drive sprocket, a clevis having a bored axis parallel to and sidewise displaced from the bored axis of the pivot in the head end of the boom and mounted on the head end thereof on the side of the boom opposite to the worm gear drive in relation to the common plane of rotation of the sprockets, a first hydraulic jack having its rod end pivotally mounted in the clevis, a trencher support trunion member pivotally mounted to the cylinder end of said first hydraulic jack, a primary extension member pivotally mounted to the frame of the tractor and fixedly supporting the trencher support trunion member, a second hydraulic jack having its rod end pivotally mounted in the primary extension member and its cylinder end pivotally mounted in the frame of the tractor, a backfill blade mounted to the front end of the primary extension member, a first four-way spool valve in fluid communication with the hydraulic motor, a first engine driven hydraulic pump having a hydraulic fluid reservoir in fluid communication with the first spool valve, a second four-way spool valve in fluid communication with the second hydraulic jack, a second engine-driven hydraulic pump having the hydraulic fluid reservoir in fluid communication with the second spool valve, a third four-way spool valve in fluid communication with the first hydraulic jack and the second pump for the hydraulic supply thereto.

* * * * *